Dec. 15, 1964   A. BAR-ON   3,161,068
MEASURING APPARATUS
Filed April 27, 1962
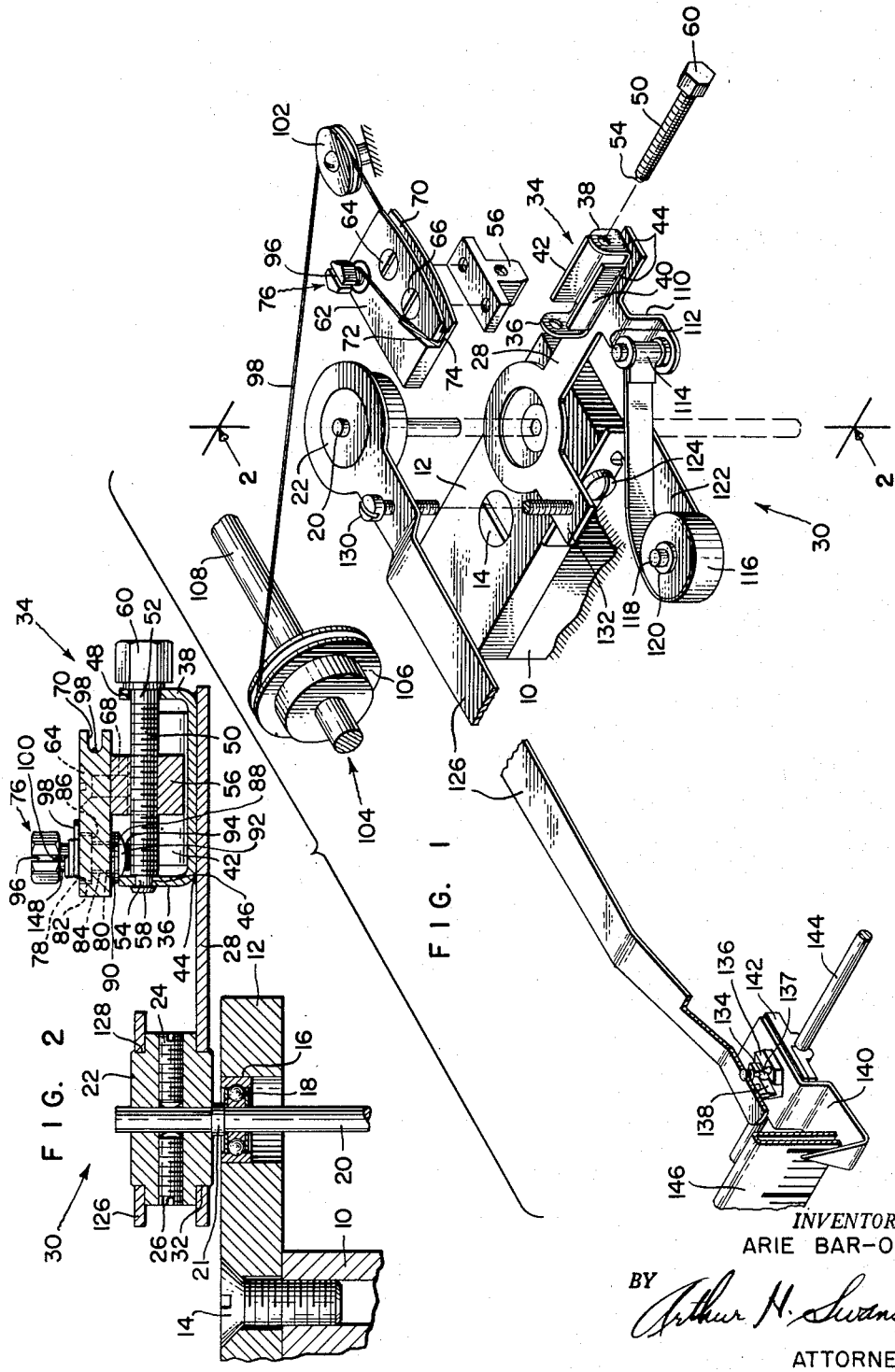
INVENTOR.
ARIE BAR-ON
BY Arthur H. Swanson
ATTORNEY.

United States Patent Office 3,161,068
Patented Dec. 15, 1964

3,161,068
MEASURING APPARATUS
Arie Bar-on, Moorestown, N.J., assignor to Honeywell Inc., a corporation of Delaware
Filed Apr. 27, 1962, Ser. No. 190,669
6 Claims. (Cl. 74—95)

The invention relates to an apparatus for varying the ratio of input to output motion of a pivoted lever.

More specifically, it is an object of the present invention to provide an adjustable apparatus for varying the ratio of input motion to output motion of a bell crank which is, e.g., transmitting motion to a pointer of an indicating mechanism.

More specifically, it is another object of the present invention to employ an adjustable zero and span unit on one of the arms of a bell crank lever to vary the zero and span adjustment of this lever for any given input motion applied thereto by a drive cord or any other input motion applying member.

Another object of the invention is to employ a unit having a zero and span adjustment on one arm of a bell crank lever mechanism whose zero adjustment will not adversely affect the span setting to which this unit has been adjusted.

It is another object of the present invention to apply a restraining force of a constant-force spring to the arm of the aforementioned bell crank lever on which the zero and span adjusting unit is mounted.

Of the drawing:

FIG. 1 is an isometric view of the zero and span adjusting unit mounted on the bell crank lever and FIG. 2 is a sectional view taken along the line 2—2 of FIG. 1.

FIG. 1 of the drawing shows a stationary block 10 and a plate 12 fixedly connected thereto by means of a screw connection 14.

The right end portion of the stationary plate 12 is shown having a cylindrical wall portion 16 that forms an aperture therein. As is best shown in FIG. 2, the outer wall surface of a ball bearing 18 is press fitted into surface-to-surface contact with the wall 16. A shaft 20 is shown mounted for rotation in the ball bearing 18. The upper end of the shaft 20 has an enlarged collar portion 21 and a hollow cylindrical hub 22 fixedly mounted thereon by means of set screws 24, 26.

A plate is shown forming one arm 28 of a bell crank lever 30. This arm 28 is fixedly staked at 32 to the hub 22 and protrudes in a left-to-right direction away from the crank arm lever fulcrum which is formed by the oscillatable shaft 20.

A bracket 34 having two turned up end portions 36, 38 and two turned up side portions 40, 42 is shown fixedly connected by suitable welding material at 44 to the upper right end surface portion of the arm 28.

The end plates 36, 38 are shown having associated wall portions 46, 48 that form apertures therein.

FIG. 2 shows the shank of a threaded span adjusting screw member 50 having two cylindrical surfaces 52, 54 in contact with their associated apertures 46, 48 formed in the end plates 36, 38.

FIG. 2 also shows the portion of the member 50 between the cylindrical surfaces 52, 54 in threaded engagement with a T-shaped member 56. The left end portion of this member 50 is peened over at 58 after it has been assembled in the bracket 34.

With this construction it can be seen that the side portions 40, 42 will prevent the T-shaped member 56 from rotating with the member 50 when the latter is rotated. It can also be seen that the T-shaped member 56 will move in a longitudinal manner to the right or left of the position shown between the side portions 40, 42 of the bracket 34 depending on which way the head 60 of the span adjusting member is rotated.

A sector pulley 62 is shown threadedly mounted on the top of the T-shaped member 56 by means of the threaded screw members 64, 66 as shown, e.g. at 68 in FIG. 2.

The sector pulley 62 is provided with a smooth grooved out peripheral portion 70, a triangular-shaped slot 72, that is positioned in an askewed relationship with the grooved portion 70 and a narrow, smooth grooved portion 74 that extends between the grooved out portion 70 and the slot 72.

A zero adjusting stud 76 is shown in FIG. 2 as having cylindrical shank portions 78, 80 spaced apart from the cylindrical wall portions 82, 84 with which they are associated.

The lower surface 86 of the stud 76, and the upper surface 88 of a washer 90, which is shown surrounding the lower end of the stud 76, are each held in frictional engagement with the surfaces of the sector pulley 62 by means of a, e.g., concave-shaped spring washer 92 which is inserted between the enlarged end portion 94 of the stud and the washer 92.

As is best shown in FIG. 1 the head portion of the stud 76 and the shank portion adjacent thereto is provided with a slotted-out wall portion 96.

One end of a cord 98 is passed through and into the base of the slot 96 formed by the shank portion of the stud 76. A knot 100 which is of a larger dimension than the width of the slot is then formed on the terminal end portion of the cord 98 to provide a way of adjusting the cord that extends through the grooves 72, 74, 70 over a guide pulley 102 to a motion input member 104, to a desired preselected length. The motion input member 104 is shown by way of illustration to be a pulley 106 which is keyed to a motion input shaft which transmits clockwise and counterclockwise rotation to the pulley 106. This pulley 106 is fixedly attached in any conventional manner to another end of the cord 98.

FIG. 1 of the drawing shows the arm 28 of the bell crank lever 30 having a J-shaped support portion 110. This support portion has projecting therefrom in a vertical direction a pin 112. A fixed loop 114 is formed at one end of a constant force spring 116, as shown in FIG. 1, to provide a pivotal connection between the pin 112 and the spring 116. The other end of the spring is coiled about this shaft 118, as shown, between the flange 120 and the support member 122 that is fixedly connected to the shaft 118.

The support member 122 in turn is shown in FIG. 1 as being fixedly connected to the stationary plate 12 by means of a suitable connection such as the screw member 124.

A second arm 126 of the bell crank 30 is staked at 128 as shown in FIG. 1 into a fixed position with the hub 22. This arm 126 is provided with an adjustable screw member 130 for adjustably separating it from the upper surface of a plate 132 that is integral with the arm 28.

The outer end of the second arm 126 is provided with a spherical pin 134 fixedly connected therewith which is shown protruding into a member 136 having a slotted wall portion 138.

The aforementioned arrangement is such that the base of the pin 134 is always retained out of contact with the bottom of the slotted wall portion 138 by a cone-shaped protuberance, e.g. 137, formed in the top surface of the member 136 which is in contact with the arm 126.

The member 136 is fixedly connected to the pointer member 140 which in turn is fixedly connected to a hollow T-shaped support member 142 that in turn is in sliding engagement with the stationary shaft 144. This structure enables the pointer 140 to be moved along a scale 146 whose front face surface is always at an equal distance from the longitudinal surface of the shaft 144.

Although the aforementioned span and zero adjusting apparatus disclosed herein has been described in connection with a bell crank actuated pointer indicating apparatus, it should be understood that such a bell crank span and zero adjusting apparatus can be used in many other levers of the first class applications of which require the input to output motion of the lever to be varied in the manner to be hereafter described.

*Zero adjustment.*—By assuming that the zero adjusting screw 76 is positioned at a location where the pointer 140 is midway between its maximum upscale and downscale position and the zero adjusting screw 76 is then rotated counterclockwise it can be seen that the cord 98 will be wrapped about the upper smooth surface of the screw 148. This action will cause the sector pulley 62, T bar member 56, screw 50, bracket 34 and the bell crank 30 connected thereto along with shaft 20 to be moved in a counterclockwise direction the adjusted amount on the bearing 18 against the bias of the constant force spring 116. It can thus be seen that the zero adjustment of the aforementioned type will cause the pointer member 140, which is attached for slidable movement with the lever arm 126, to be moved to the right of the position shown.

It can also be seen that the aforementioned resulting change in the zero position of the pointer 140 can be made without introducing any adverse change in the span setting of screw 50 which was present before the zero adjustment was made.

In other words, after the pointer 140 has been set at a new zero position it will still be moved upscale and downscale the same amount as it moved before the zero adjustment to the stud 76 took place.

This no-shift in span is possible because the radial distance between the center of the shaft 20, which forms the fulcrum for the bell crank 30, and the point at which the cord 98 contacts the groove 70 is not altered during a zero adjustment of stud 76.

In a similar but opposite manner as that previously described, it can be seen that when the stud 76 is rotated in an opposite or clockwise direction the pointer will be moved to the left of the position shown without any adverse effect on the span setting of the span adjusting member 60.

*Span adjustment.*—When the span adjusting means is rotated in one direction so that the T-shaped block 56 is moved to the left of the position shown in FIG. 2, the distance between the center of the shaft 20, which forms the fulcrum of the bell crank 30, and the point at which the cord 98 contacts the groove 70 will be reduced. Therefore, it can be seen that when the T-shaped block 56 and the sector pulley 62 are adjusted to their new positions the moment arm about which the input motion is applied to the arm 28 will likewise be reduced from the value it was at prior to the span adjustment. It can thus be seen that under this span adjusted condition the movement of the bell crank 30 and the movement of the pointer 140 along the scale 146 will be reduced from that bell crank and pointer movement that was attainable before the aforementioned span adjustment was made.

In a similar but opposite manner it can be seen that when the span adjusting member 60 is rotated in a direction that will move the T-shaped block 56 to the right of the position shown in FIG. 1, then, the moment arm about which the input motion will then be applied to the arm 28 will be increased from the value it was at prior to this last-mentioned span adjustment.

With this last-mentioned span adjustment it can be seen that the movement of the bell crank 30 and the movement of the pointer 140 along the scale 146 will be increased from that bell crank and pointer movement that was possible before this span adjustment was made.

The aforementioned bell crank adjusting apparatus discloses a span adjusting means for altering the magnitude of input to output motion of a bell crank, which span adjusting means is uniquely positioned at substantially the same location on an arm of the bell crank as the zero adjusting means so that a zero adjustment may be made without any adverse effect on the span.

What is claimed is:

1. Apparatus for varying the ratio of input to output motion of a lever of the first class, comprising a bearing member forming a fulcrum about which the lever is rotated, a sector pulley operably connected for applying a span adjusting movement with respect to an end portion of the lever to which an input motion is applied, a zero adjusting stud rotatably connected by way of a friction drag member to a flat side portion of the sector pulley, a drive cord of a preselected length, one end portion of the cord being adapted to have the input motion applied thereto, said drag member being in physical frictional contact with the sector pulley and the stud to enable the stud to the rotated in a clockwise or counterclockwise direction thereon to any one of a number of fixed angularly displaced positions, the other end portion of the cord having a surface thereof in engagement with an outer peripheral grooved surface of the sector pulley which has a terminal part thereof connected to an outer peripheral portion of the stud for winding and unwinding thereon to change the unwound active length of the drive cord when the stud is rotated between any one of the fixed angularly displaced positions without altering the distance between the bearing member and the surface of the cord that is in engagement with the grooved surface of the sector pulley, and a biasing means having one of its end portions fixed to a stationary member and another extensible end portion pivotally connected for movement with the lever.

2. Apparatus for varying the ratio of input to output motion of a bell crank lever, comprising a bearing member forming a fulcrum about which the bell crank lever is rotated, a sector pulley operably connected for applying a span adjusting movement along one of the arms of the bell crank lever, a stud rotatably connected by way of a friction drag member to a flat side portion of the sector pulley, a drive cord of a preselected length one end portion of the cord being adapted to have the input motion applied thereto, said drag member being in physical frictional contact with the sector pulley and the stud to enable the stud to be rotated in a clockwise or counter-clockwise direction thereon to any one of a number of fixed angularly displaced positions, the other end portion of the cord having a surface thereof in engagement with an outer peripheral grooved surface of the sector pulley which has a terminal part thereof connected to an outer peripheral portion of the stud for winding and unwinding thereon to change the unwound active length of the drive cord when the stud is rotated between any one of the fixed angularly displaced positions without altering the distance between the bearing member and the surface of the cord that is in engagement with the grooved surface of the sector pulley, and a biasing means having one of its end portions fixed to a stationary member and another extensible end portion pivotally connected for movement with the bell crank arm.

3. The apparatus for varying the ratio of input to output motion of a bell crank lever as defined in claim 2 wherein the outer end of another arm of the bell crank lever is employed to move an indicating pointer along an indicating scale.

4. The apparatus for varying the ratio of input to output motion of a bell crank lever as defined in claim 2 where the clockwise and counter-clockwise rotation of the stud between one fixed angularly displaced position and another provides a zero adjustment for the bell crank lever.

5. The apparatus for varying the ratio of input to output motion of a bell crank lever as defined in claim 2 wherein a mechanically actuated span adjusting mechanism is employed as the connection between the sector pulley and the said one arm of the lever for radially moving the sector to any one of a number of different fixed positions on the arm.

6. The apparatus for varying the ratio of input to output motion of a bell crank lever as defined in claim 2, wherein the rotation of the stud in one direction is employed to reduce the active length of the cord extending between the end portion of the crank having an input motion applied thereto and the point where the cord contacts the peripheral surface of the stud and wherein the rotation of the stud in another opposite direction is employed to increase said active length of the cord.

References Cited in the file of this patent

UNITED STATES PATENTS

| | | |
|---|---|---|
| 1,235,286 | Burton | July 31, 1917 |
| 1,795,267 | Stuart | Mar. 3, 1931 |
| 1,946,296 | Stephenson | Feb. 6, 1934 |
| 2,193,095 | Harrison | Mar. 12, 1940 |
| 2,455,329 | Cook | Nov. 30, 1948 |
| 2,647,743 | Cook | Aug. 4, 1953 |
| 2,771,808 | Jenkins | Nov. 27, 1956 |
| 2,997,888 | Rust | Aug. 29, 1961 |

FOREIGN PATENTS

| | | |
|---|---|---|
| 294,447 | Great Britain | July 27, 1928 |